US009622548B2

(12) United States Patent
Renforth

(10) Patent No.: US 9,622,548 B2
(45) Date of Patent: Apr. 18, 2017

(54) ONE-HANDED CONNECTOR

(71) Applicant: DOSKOCIL MANUFACTURING COMPANY, INC., Arlington, TX (US)

(72) Inventor: Jack W. Renforth, Azle, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 241 days.

(21) Appl. No.: 14/513,433

(22) Filed: Oct. 14, 2014

(65) Prior Publication Data

US 2015/0101159 A1    Apr. 16, 2015

Related U.S. Application Data

(60) Provisional application No. 61/890,590, filed on Oct. 14, 2013.

(51) Int. Cl.
*A44B 11/26* (2006.01)
*A01K 27/00* (2006.01)

(52) U.S. Cl.
CPC .......... *A44B 11/266* (2013.01); *A01K 27/005* (2013.01); *Y10T 24/45257* (2015.01)

(58) Field of Classification Search
CPC .............. A44B 11/266; A44B 11/2515; A44B 11/2592; A01K 27/005; Y10T 24/45257; Y10T 24/45623; Y10T 24/2549; Y10T 24/5529; Y10T 24/45607; Y10T 24/45581; F41H 1/02
USPC ........................... 24/607, 615, 616, 631, 632
See application file for complete search history.

(56) References Cited

U.S. PATENT DOCUMENTS 4,793,032 A * 12/1988 Crowle ................ A44B 11/266
                                                                  24/607

* cited by examiner

*Primary Examiner* — Jack W Lavinder
(74) *Attorney, Agent, or Firm* — Global IP Counselors, LLP

(57) ABSTRACT

A one-handed connector apparatus includes a male portion that is receivable in a female portion. The male portion includes a plurality of protuberances that extend from a base and that are receivable in a receptacle formed in the female portion. A compressive force applied to an outboard one of the protuberances deflects the outboard protuberance toward an inboard protuberance and causes the outboard and inboard protuberances to together be elastically deflected from a first position to a second position. In the first position, a set of first latching structures situated on the protuberances are in an interference position with a set of corresponding second latching structures that are situated on the female portion. In the second position, the first latching structures are moved out of the interference position, thereby permitting the male portion to be removed from the female portion.

13 Claims, 5 Drawing Sheets

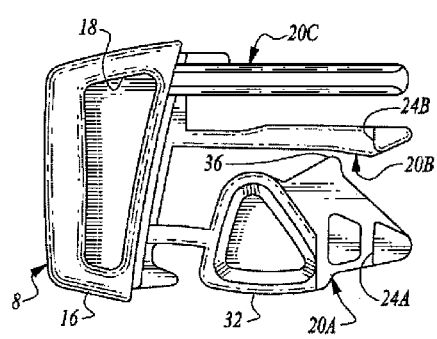 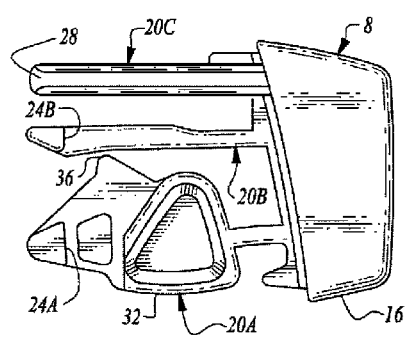 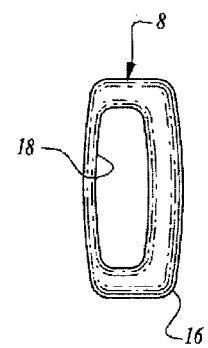
Fig. 7B  Fig. 7A  Fig. 7D
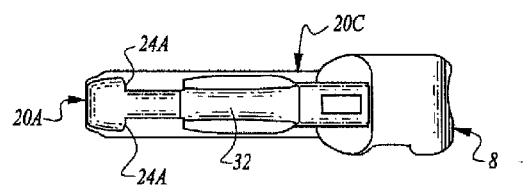
Fig. 7C

ONE-HANDED CONNECTOR

CROSS-REFERENCE TO RELATED APPLICATION

The instant application claims priority from U.S. Provisional Patent Application Ser. No. 61/890,590 filed Oct. 14, 2013, the disclosures of which are incorporated herein by reference.

BACKGROUND

Field

The disclosed and claimed concept relates generally to detachable connection device and, more particularly, to a connector having cooperable male and female portions and that is movable from a connected condition to a detached condition through the use of only a single hand.

Related Art

Numerous types of connection devices are known in the relevant art. Certain connection devices such as glue, nails, and the like, are intended to non-detachably connect things together, whereas other types of connection devices such as buckles, hook-and-loop connectors, and the like are intended to detachably connect things together.

A well-known type of detachable connector includes a female portion and a male portion that are cooperable. The female portion has a receptacle and has a set of locking structures on opposite sides of the receptacle and further has a pair openings generally adjacent the locking structures on opposite sides of the receptacle. The male portion has another set of locking structures on opposite sides thereof that are cooperable with the locking structures on the female portion when the male portion is received in the receptacle. In such a connected condition, a pair of button-like structures on the male portion are received in the openings, and the locking structures on the male portion are in an interference position with the corresponding locking structures on the female portion. In the interference position, the locking structures on the male portion are situated to be engaged with or to be engageable with the corresponding locking portions on the female portion, which resists removal of the male portion from the receptacle on the female portion.

When a pair of confronting compressive forces are applied to the button-like structures of the male portion (that are received in the openings on the female portion), the compressive forces elastically deflect certain other structures of the male portion to move the locking structures thereof out of the interference position. This permits the male portion to be removed from the female portion to detach from one another whatever items are connected with the male and female portions. While such connectors and other connectors have been generally effective for their intended purposes, they have not been without limitation.

In order to detach such connectors, the confronting compressive forces that are applied to the male portion often need to be more or less precisely confronting one another and more or less of the same magnitude in order to cause the corresponding latching structures on both sides of the male portion to be simultaneously moved out of interference with the corresponding latching structures on the female portion to permit removal of the male portion from the receptacle. The application of such confronting forces with the necessary degree of precision is not always easy, and first attempts to apply such confronting forces to detach the male and female portions from one another are often unsuccessful and require second or even third attempts. Such detachment can be made even more difficult when the connector is employed as a part of a detachable dog collar or cat collar that is situated about the neck of an animal. The neck of an animal typically is relatively low to the floor, at least compared with the height of a person's hands when standing, and the animal's neck typically protrudes from its body at an oblique angle to the floor. The applying of such confronting forces with the required degree of precision in the context of an animal collar may be even more difficult due to the awkward position of at least one of the two button-like structures that must be pressed simultaneously in order to open the connector. Such difficulty may be exacerbated by the button being embedded in animal fur or situated at the underside of the neck that is difficult for the user to see. Improvements thus would be desirable.

SUMMARY

An improved one-handed connector apparatus includes a male portion that is receivable in a female portion. The male portion includes a plurality of protuberances that extend from a base and that are receivable in a receptacle formed in the female portion. A compressive force applied to an outboard one of the protuberances deflects the outboard protuberance toward an inboard protuberance and causes the outboard and inboard protuberances to together be elastically deflected from a first position to a second position. In the first position, a set of first latching structures situated on the protuberances are in an interference position with a set of corresponding second latching structures that are situated on the female portion. In the second position, the first latching structures are moved out of the interference position, thereby permitting the male portion to be removed from the female portion. The elastic deflection of the outboard protuberance and the resultant elastic deflection of the inboard protuberance results from a single compressive force applied to the outboard protuberance and causes all of the first latching structures to become disengaged from all of the second latching structures and permits the male and female portions to become detached.

Accordingly, an aspect of the disclosed and claimed concept is to provide an improved detachable connector that can be easily moved from a connected condition to a detached condition through the use of only a single hand actuating only a single button.

Another aspect of the disclosed and claimed concept is to provide a detachable connector that avoids the need for precise confronting forces to be applied to opposite sides of the connector in order to move it to the detached condition.

Accordingly, an aspect of the disclosed and claimed concept is to provide an improved connector apparatus that can be generally stated as including a first component and a second component. The first component can be generally stated as including a base, a number of elongated protuberances that extend from the base, and a number of first latches that are situated on at least some of the protuberances of the number of protuberances at a location distal to the base. The second component can be generally stated as including an elongated receptacle having a mouth within which the number of protuberances are at least partially receivable, a number of walls situated adjacent the receptacle, and a number of second latches disposed on at least some of the walls of the number of walls and being situated generally within the receptacle. The first and second components are movable between a connected condition and a detached condition. A protuberance of the number of protuberances has disposed thereon a first latch of the number of first latches and is elastically deflectable between a first position and a second position. Another protuberance of the number of protuberances has disposed thereon another first latch of the number of first latches and is elastically deflectable between another first position and another second position. The protuberance moving toward the second position is engageable with the another protuberance. In the connected condition, the number of protuberances are at least partially received in the receptacle, the number of first latches are engageable with the number of second latches to resist removal of the number of protuberances from the receptacle, and the protuberance is engageable by a force to deflect the protuberance in a direction generally toward the second position to thereby engage the another protuberance and deflect it in a direction generally toward the another second position to move the number of first latches away from engagement with the number of second latches and to permit the first and second components to be movable toward the detached condition.

BRIEF DESCRIPTION OF THE DRAWINGS

A further understanding of the disclosed and claimed concept can be gained from the following Description when read in conjunction with the accompanying drawings in which:

FIGS. 7A, 7B, 7C, and 7D are front, rear, bottom, and right side views, respectively, of a male portion of the connector apparatus of FIG. 1.

Similar numerals refer to similar parts throughout the specification.

DESCRIPTION

Figure 1:
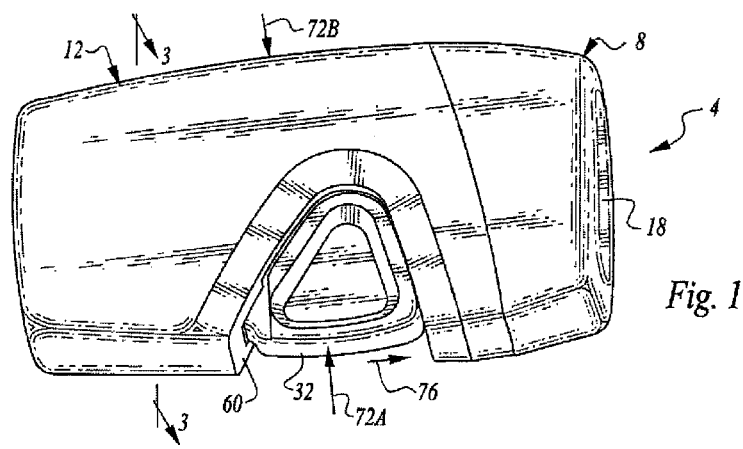
FIG. 1 is a perspective view of an improved one-handed connector apparatus in accordance with the disclosed and claimed concept that is in a connected condition.
Figure 2:
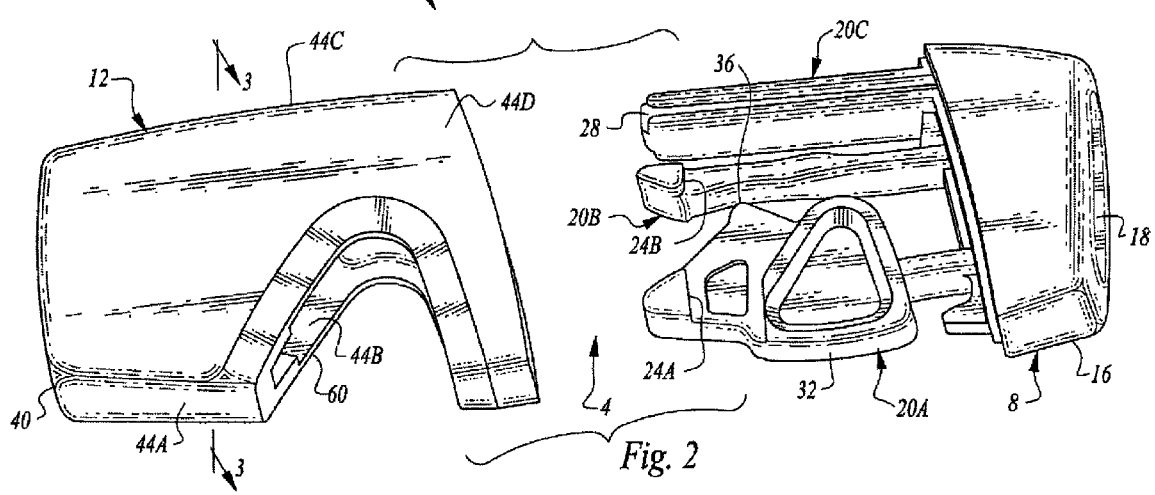
FIG. 2 is a view similar to FIG. 1, except depicting the connector apparatus in a detached condition.

An improved one-handed connector apparatus 4 is depicted in FIGS. 1-7D. The connector apparatus 4 is usable in any of a variety of environments, and is particularly useful in the environment of a clasp for an animal collar. As will be set forth in greater detail below, the improved connector apparatus 4 advantageously can be operated by applying an elastically deforming compressive force to only one side of the connector apparatus 4 while applying on an opposite side of the connector apparatus 4 a retaining force that is not intended to deform any part of the connector apparatus 4. The connector apparatus 4 is thus easier to open than previously known closures because only one side of the connector apparatus 4 needs to be elastically deformed in order to move the connector apparatus 4 from a connected condition, such as is depicted in FIG. 1, to a detached condition, as is depicted in FIG. 2.

The connector apparatus 4 includes a first portion 8 which may also be referred to as a male component. The connector apparatus 4 further includes a second portion 12 which may also be referred to as a female component. In the connected condition of FIG. 1, at least a portion of the second portion 12 is received within an interior region of the first portion 8.

The first portion 8 can be said to include a base 16 having a hole 18 formed therein that is structured to receive an object such as an end of an animal collar, and further includes a set of protuberances 20A, 20B and 20C that are situated on the base 16. The protuberances 20A, 20B and 20C are each generally elongated, and the protuberances 20A and 20B are manually elastically deformable. The first portion 8 further includes a number of first latches 24A and 24B that are situated on the protuberances 20A and 20B at the end thereof that is distal to the base 16, i.e., at the end opposite the base 16. As used herein, the expression "a number of" and variations thereof shall refer broadly to any non-zero quantity, including a quantity of one. The protuberance 20C includes a pair of elongated slots 28 that are generally straight and are sized to generally not be manually deformable, at least to be generally non-deformable within the range of manual forces that the connector apparatus 4 is expected to experience.

The protuberance 20A further includes an actuator 32 and a transfer lug 36. The actuator 32 is a button portion of the protuberance 20A that is manually engageable by a user who can apply an elastically deformative compressive force to the actuator 32 to cause the actuator to move from its free state, such as is depicted generally in FIG. 2 to an elastically deformed state. The transfer lug 36 is engageable with the protuberance 20B during at least a portion of the movement of the protuberance 20A between its free state and its elastically deflected state. The engagement of the transfer lug 36 with the protuberance 20B causes the protuberance 20B to thus likewise be moveable between its free state, such as is depicted generally in FIG. 2, and an elastically deflected state. That is, the protuberance 20A moving toward its elastically deflected position engages with its actuator 32 the protuberance 20B and elastically moves the protuberance 20B toward its own elastically deflected position. The actuator 32 is engageable by user who applies a compressive force to the actuator 32 from the exterior of the connector apparatus 4, which causes elastic deformation of the protuberance 20A until the point at which the transfer lug 36 engages the protuberance 20B. Further application of the deforming force to the actuator 32 causes the protuberances 20A and 20B to together elastically deform in the same direction until they reach their elastically deformed conditions, which typically occurs at or before the point at which the protuberance 20B is elastically deformed sufficiently to engage the protuberance 20C. Removal of the compressive force from the actuator 32 results in the protuberances 20A and 20B elastically returning to their free state.

The second portion 12 can be said to include an end portion 40 having a hole 42 formed therein or having another connector situated thereon that enables connection with another structure, such as the opposite end of an animal collar. The second portion 12 further includes a plurality of walls 44A, 44B, 44C and 44D that extend from the end portion 40. The second portion 12 additionally includes an elongated receptacle 48, with the walls 44A, 44B, 44C and 44D being situated adjacent the receptacle 48. The second portion 12 also includes a mouth 52 situated at an end of the receptacle 48 that is opposite the end portion 40, with the receptacle 48 being in communication with the mouth 52.

The second portion 12 further includes a plurality of second latches 56A and 56B that are cooperable with the first latches 24A and 24B. The second latches 56A and 56B are situated on the walls 44B and 44D and are situated within or adjacent the receptacle 48. The second portion 12 also has an opening 60 formed therein that is, in the depicted exemplary embodiment, formed in the walls 44A, 44B, and 44D. The opening 60 is in communication with the receptacle 48. The wall 44C can be said to include an engagement region 64 that is situated on the second portion 12 in a position generally opposite the opening 60 and which free of holes or other openings. The engagement region 64 is engageable by a user who applies thereto a retaining force when the actuator 32 is simultaneously engaged by the user with an elastically deforming force, such as occurs when the connector apparatus 4 is being moved from its connected condition toward its detached condition. The elastically deforming force and the retaining force are compressive forces that may confront one another, meaning that they may be face-to-face with one another.

Figure 3:
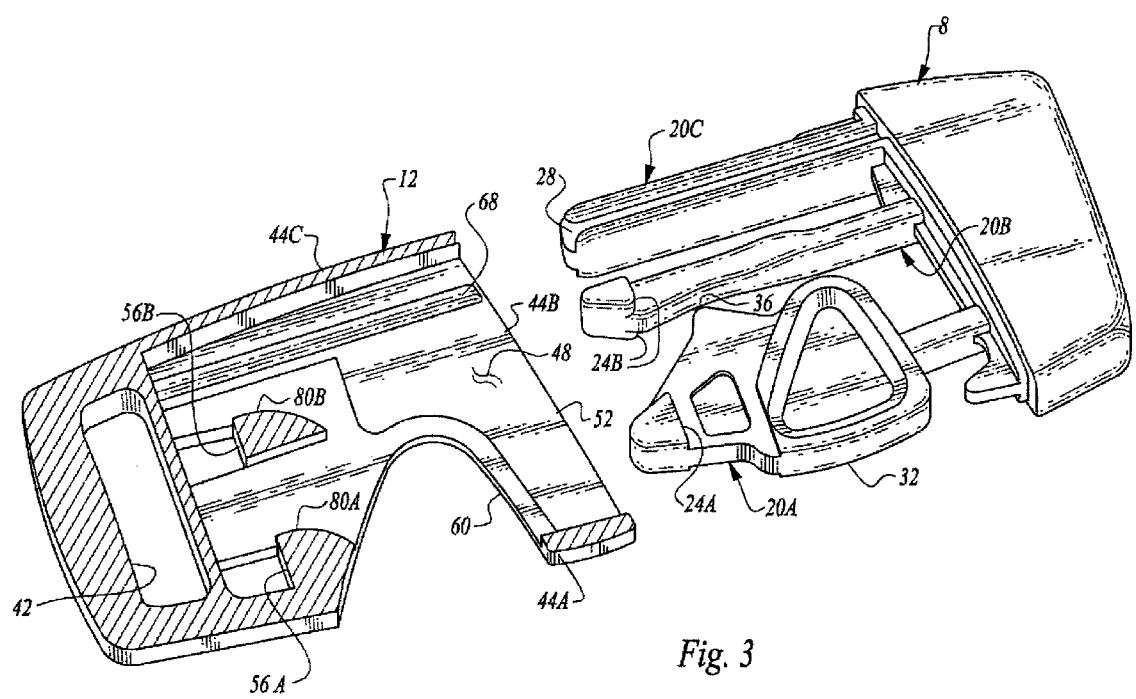
FIG. 3 is a partial sectional view as taken along line 3-3 of FIG. 2.

The second portion 12 can additionally be said to include a pair of rails 68, one of which is depicted in FIG. 3, which are situated on the walls 44B and 44D within or adjacent the receptacle 48. The rails 68 are elongated and are generally linear, i.e., straight, in the depicted exemplary embodiment. The rails 68 are receivable in the slots 28 when the first portion 8 is at least partially received in the receptacle 48. The rails 68 and the slots 28 serve as alignment structures that maintain a desired alignment between the first and second portions 8 and 12 when moving them between the detached condition and the connected condition. The rails 68 and the slots 28, when engaged together, additionally serve as supports that resist movement of various parts of the first portion 8 when the protuberances 20A and 20B are subject to a compressive force that causes them to be in an at least partially deflected condition. For example, the engaged-together rails 68 and the slots 28 resist movement of the base 16 with respect to the second portion 12.

When the protuberances 20A, 20B and 20C are situated in the receptacle 48 and the first latches 24A and 24B are engaged with the second latches 56A and 56B, it can be seen that the actuator 32 is disposed in or adjacent the opening 60. In such a situation, the first and second portions 8 and 12 are in the connected condition. Moreover in such an exemplary situation, the engagement of the first latches 24A and 24B with the second latches 56A and 56B, respectively, results from the protuberance 20A being slightly elastically deformed and thus being biased toward the wall 44A to cause such engagement. During such engagement between the first latches 24A and 24B and the second latches 56A and 56B, it can be said that the first latches 24A and 24B and the second latches 56A and 56B are respectively in an interference position with respect to one another that resists the first portion 8 from being detached from the second portion 12.

When a pair of compressive forces 72A and 72B (FIG. 1) are applied to the actuator 32 and the engagement region 64, respectively, the protuberances 20A and 20B are elastically deformed. When the elastic deformation of the protuberances 20A and 20B is sufficient to cause the first latches 24A and 24B to be translated or otherwise moved out of the interference position with respect to the second latches 56A and 56B, respectively, the first and second latches 24A, 24B, 56A, and 56B are out of engagement with one another. In such a situation, the protuberances 20A and 20B can be said to be in their elastically deflected state and thus in their unlatched state. The confronting compression forces 72A and 72B can be said to include a deforming force 72A that elastically deforms the protuberances 20A and 20B, and the force 72B can be said to be a retaining force 72B that is applied to the engagement region 64 in order to retain the second portion 12 in a given position whereby the deforming force 72A and 72B can deform the protuberances 20A and 20B. The two compressive forces 72A and 72B are depicted herein in an exemplary fashion as confronting one another. It is expressly noted, however, that an advantage of the disclosed and claimed concept is that other compressive forces that are not necessarily confronting and that may be offset from one another can still deform the protuberances 20A and 20B since the precise location of the second compressive force 72B on the wall 44C and its orientation are not critical to such deformation.

Once the deforming force 72A has elastically deformed the protuberances 20A and 20B sufficiently that the first latches 24A and 24B have been shifted enough to take them out of the interference position and to disengage them from the second latches 56A and 56B, respectively, the user can additionally apply a removal force 76 to the actuator 32 to translate the protuberances 20A, 20B and 20C out of the receptacle 48 to move the first and second portions 8 and 12 to their detached condition. It is noted that other such removal forces applied at other locations on the connection apparatus 4 can move it to the detached condition.

Figure 4:
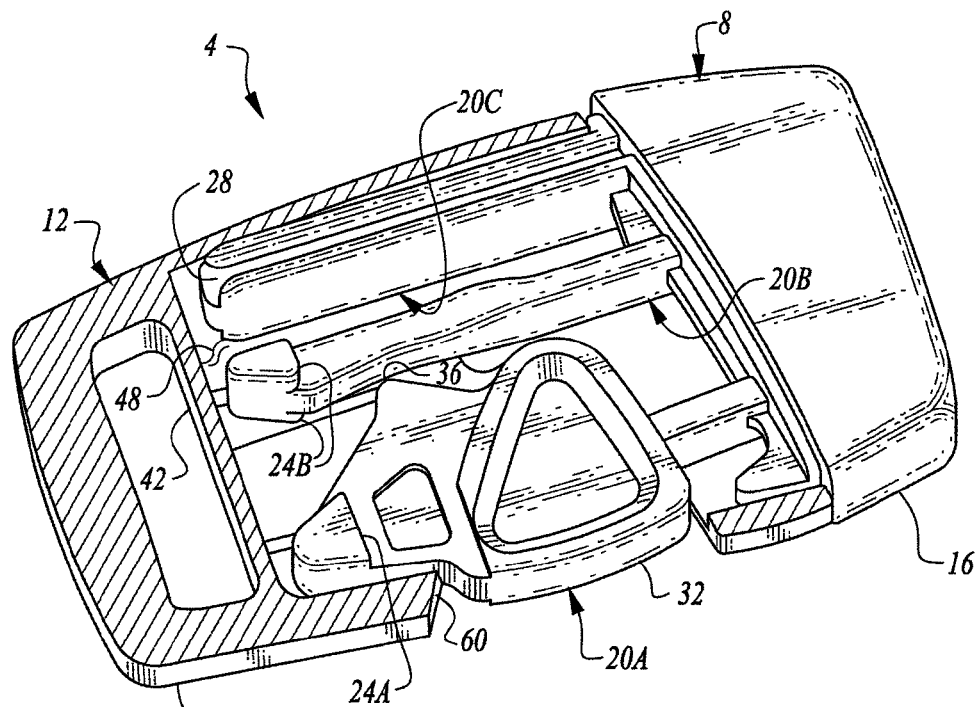
FIG. 4 is a view similar to FIG. 3, except depicting the partially sectioned connector apparatus in the connected condition.
Figure 5:
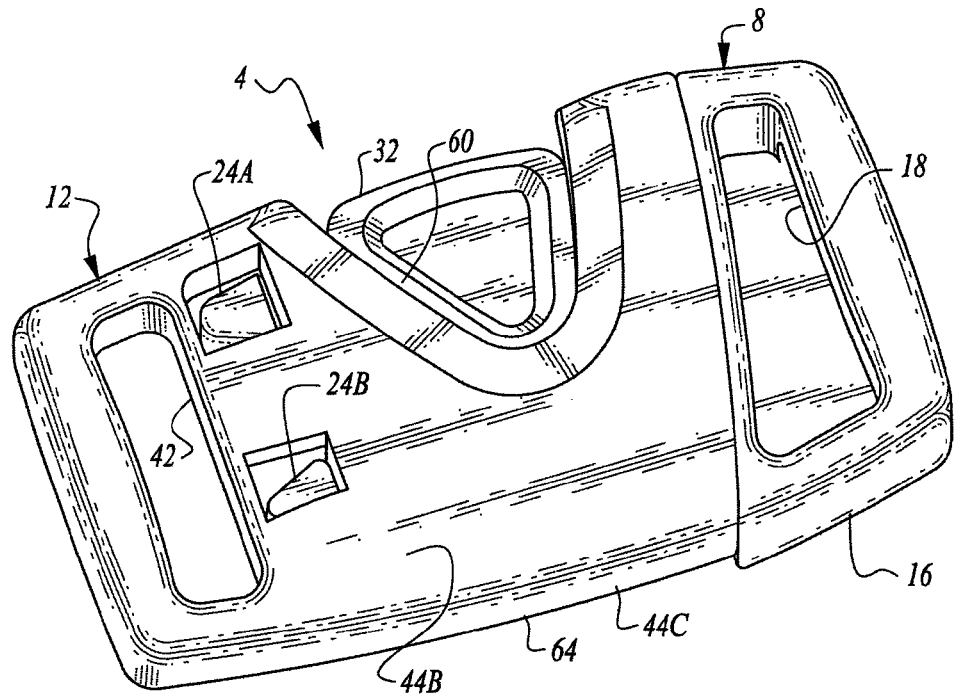
FIG. 5 is a view similar to FIG. 4, except depicting an opposite side of the partially sectioned connector apparatus.
Figure 6C:
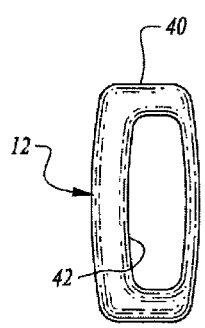
FIGS. 6A, 6B, 6C, and 6D are front, rear, left, and right views, respectively, of a female portion of the connector apparatus of FIG. 1.
Figure 6A:
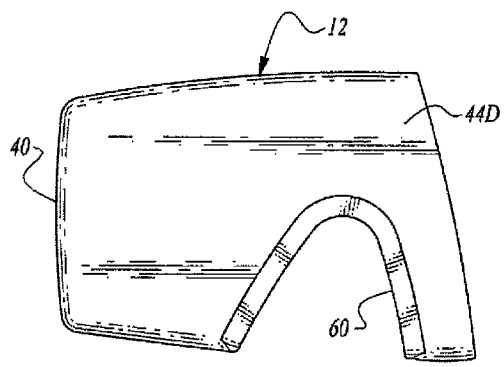
Figure 6D:
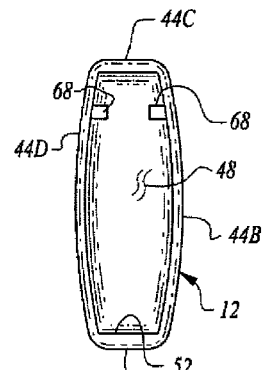
Figure 6B:
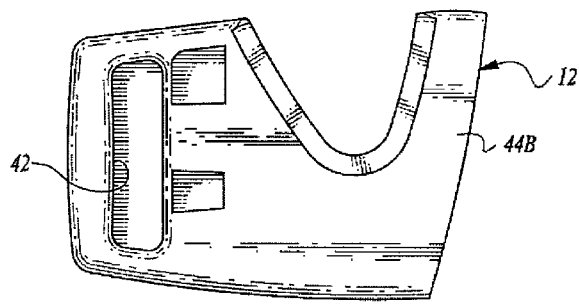

As can be understood from FIGS. 3 and 4, the reception of the rails 68 in the slots 28 causes the first portion 8 to become aligned in a desired orientation with respect to the second portion 12. This may occur during movement of the first and second portions 8 and 12 from their detached condition toward their connected condition. When the first portion 8 is sufficiently advanced within the receptacle 48 toward the connected condition, ramped engagement surfaces 80A and 80B on the first latches 24A and 24B, respectively, engage corresponding surfaces on the second latches 56A and 56B to elastically deform the protuberances 20A and 20B in a direction generally toward the wall 44C. Such deformation is in a direction generally toward the elastically deflected condition of the protuberances 20A and 20B, and such deformation continues until the first latches 24A and 24B clear the second latches 56A and 56B and the elasticity of the protuberances 20A and 20B biases the first latches 24A and 24B into engagement with the second latches 56A and 56B.

In such a condition, the first portion 8 is fully received in the receptacle 48 of the second portion 12, and the protuberances 20A and 20B have elastically returned toward their free state, such as is depicted generally in FIG. 4. In such a position, the first latches 24A and 24B are latched with the second latches 56A and 56B, respectively, and are in the interference position with respect to one another to resist movement of the first portion 8 away from the second portion 12. It is understood that when the first and second portions 8 and 12 are in the connected condition depicted generally in FIG. 4, the protuberance 20A and/or the protuberance 20B may or may not remain in a residual state of partial elastic deformation depending upon the particular configuration of the receptacle 48, i.e., depending upon the specific design of the connector 4. In such a state, however, the first latches 24A and 24B remain latched with the second latches 56A and 56B, respectively.

Since the connector apparatus 4 is moved from its connected condition toward its detached condition via only a single deformation force, i.e., the deformation force 72A, the connector apparatus 4 is easier to unlatch than other clasps that require two opposed and equal deformation forces to open. While the exemplary retaining force 72B is depicted herein as confronting the deformation force 72A, it is expressly noted that other retaining forces applied to the connector apparatus 4 can be used to retain the connector apparatus 4 sufficiently to enable the deformation force 72A to disengage the first latches 24A and 24B from the second latches 56A and 56B to thereby permit the connector apparatus to moved from the connected condition to the detached condition.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A connector apparatus comprising:
    a first component comprising:
        a base,
        a number of elongated protuberances that extend from the base, and a number of first latches that are situated on at least some of the protuberances of the number of protuberances at a location distal to the base;
    a second component comprising:
        an elongated receptacle having a mouth within which the number of protuberances are at least partially receivable, a number of walls situated adjacent the receptacle, and a number of second latches disposed on at least some of the walls of the number of walls and being situated generally within the receptacle;
    the first and second components being movable between a connected condition and a detached condition;
    a protuberance of the number of protuberances having disposed thereon a first latch of the number of first latches and being elastically deflectable between a first position and a second position; the protuberance having a button portion situated generally between the first latch and the base, the number of walls having formed therein an opening that is in communication with the receptacle and that is formed in at least a first wall of the number of walls,
    another protuberance of the number of protuberances having disposed thereon another first latch of the number of first latches and being elastically deflectable between another first position and another second position;
    the protuberance moving toward the second position being engageable with the another protuberance;
    in the connected condition:
        the number of protuberances being at least partially received in the receptacle,
        the number of first latches being engageable with the number of second latches to resist removal of the number of protuberances from the receptacle, and
        the protuberance being engageable by a force to deflect the protuberance in a direction generally toward the second position to thereby engage the another protuberance and deflect it in a direction generally toward the another second position to move the number of first latches away from engagement with the number of second latches and to permit the first and second components to be movable toward the detached condition, the button portion of the protuberance being situated generally within the opening of the number of walls.

2. The connector apparatus of claim 1 wherein the button portion includes a protruding lug that is engageable with the another protuberance when the protuberance is moved in a direction generally toward the second position.

3. The connector apparatus of claim 1 wherein the opening is spaced from the mouth.

4. The connector apparatus of claim 1 wherein the button is structured to have applied thereto as the force a first compressive force from the exterior of the receptacle.

5. The connector apparatus of claim 4 wherein the protuberance and the another protuberance, when moving toward the respective second position and another second position, move in a direction generally away from the first wall and toward a second wall of the number of walls that is situated on the second component opposite the first wall, the second wall being substantially continuous and substantially free of openings that are in communication with the receptacle and being structured to have applied thereto a second compressive force.

6. The connector apparatus of claim 4 wherein the first and second compressive forces confront one another.

7. The connector apparatus of claim 4 wherein the first and second compressive forces need not be confronting one another.

8. The connector apparatus of claim 1 wherein in the connected condition the protuberance is biased toward the first position to engage the number of first latches with the number of second latches.

9. The connector apparatus of claim 8 wherein in the connected condition the number of first latches are in interference with the number of second latches, and wherein the number of first latches are out of interference with the number of second latches when the protuberance and the another protuberance are respectively in the second position and the another second position.

10. The connector apparatus of claim 1 wherein the number of protuberances further comprise an elongated first alignment structure, the second component comprising an elongated second alignment structure, the first and second alignment structures being slidably cooperable with one another in a direction generally along their longitudinal extent when the first and second components are moving from their detached condition toward their connected condition and the number of protuberances are being at least partially received in the receptacle.

11. The connector apparatus of claim 10 wherein the another protuberance is situated generally between the protuberance and the first alignment structure.

12. The connector apparatus of claim 10 wherein the first and second alignment structures in the connected condition are engaged with one another along at least a portion of their longitudinal extent and are structured to resist movement of the base when the force deflects the protuberance and the another protuberance respectively generally toward the second position and another second position.

13. The connector apparatus of claim 1 wherein the protuberance and the another protuberance, when moving toward the respective second position and another second position, move in the same direction with respect to the second component.

\* \* \* \* \*